United States Patent
Miranda et al.

(10) Patent No.: US 7,336,800 B2
(45) Date of Patent: Feb. 26, 2008

(54) METHOD AND A DEVICE FOR DETECTING A WATERMARK IN DIGITAL DATA

(75) Inventors: Trevor Miranda, Uttar Pradesh (IN); Manindra Mohan, Uttar Pradesh (IN)

(73) Assignee: Indian Institute of Information Technology, Uttar Pradesh (IN)

( * ) Notice: Subject to any disclaimer, the term of this patent is extended or adjusted under 35 U.S.C. 154(b) by 806 days.

(21) Appl. No.: 10/437,070

(22) Filed: May 14, 2003

(65) Prior Publication Data

US 2004/0062394 A1 Apr. 1, 2004

(30) Foreign Application Priority Data

May 16, 2002 (IN) .......................... 563/DEL/2002

(51) Int. Cl.
*G06K 9/00* (2006.01)

(52) U.S. Cl. ...................................... 382/100; 382/232

(58) Field of Classification Search ................ 382/100, 382/232, 248, 250
See application file for complete search history.

(56) References Cited

U.S. PATENT DOCUMENTS

| 5,930,369 | A | * | 7/1999 | Cox et al. ...................... 380/54 |
| 6,104,826 | A | * | 8/2000 | Nakagawa et al. .......... 382/100 |
| 6,185,312 | B1 | * | 2/2001 | Nakamura et al. .......... 382/100 |
| 6,208,735 | B1 | | 3/2001 | Cox et al. |
| 6,359,998 | B1 | * | 3/2002 | Cooklev ...................... 382/100 |

* cited by examiner

*Primary Examiner*—Samir Ahmed
*Assistant Examiner*—Claire X Wang
(74) *Attorney, Agent, or Firm*—Venable LLP; Michael A. Gollin; Ian S. Harrison

(57) ABSTRACT

The present invention relates to a method, computer program product and a device for detecting watermarks in digital data for the purpose of electronic copyright management system. The invention includes transforming the original as well as unwatermarked data. Thereafter, tagging the resultant components of the transformed data using a pair of rows and columns. Then, selecting significant components in the said transformed data, transforming the suspected watermarked data and tagging the components in the transformed data. Further, selecting the tagged components from the transformed suspected watermarked data corresponding to those selected as significant in the original transformed data, and comparing said two groups of selected significant components to detect the watermarks.

22 Claims, 4 Drawing Sheets

( X Scale – Watermarks, Y Scale – Correlation )

( X Scale – Watermarks, Y Scale – Correlation )

METHOD AND A DEVICE FOR DETECTING A WATERMARK IN DIGITAL DATA

The present invention relates to a method and a device for detecting watermarks in digital data of images, sound, video and the like for the purpose of electronic copyright management system.

BACKGROUND

With the advent of the Internet and the subsequent publication of digital data on the web, it is becoming increasingly difficult for the owner of the material to exercise his intellectual property right such as copyright. Technologies are widely available for making accurate copies of digital data. Digital techniques let the original information be recreated in a very accurate manner. Any one can copy the data and claim it as his collection.

In order to uniquely mark the digital data, a technique called watermarking exists in which the digital data is inserted with an invisible watermark. Digital watermarking techniques are used to embed a known piece of digital data within another piece of digital data. The embedded piece of data (watermark) acts as a fingerprint for the owner, allowing the protection of copyright, authentication of the data, and tracing of illegal copies.

This watermark which is normally not known to anybody helps in catching those who copy the data. Any data that is suspected by its owner to have been copied by a third party can examine the suspected data and look for his watermark. If found then he can easily prove his ownership.

One of the older techniques used to embed watermark in the digital data is by Spatial Domain Techniques. Spatial domain techniques work by embedding the data in the spatial domain, in other words, in the image data as it is. The earliest schemes worked by embedding the watermark in the Least Significant Bit (LSB) of the image data. Obviously, such techniques have low reliability. Spatial domain schemes based on different kinds of gray level transformations were proposed. Bruyndoncks et al. proposed a scheme based on pixel region classification. The pixels in an image are classified as pertaining to regions of hard, progressive or noise contrast. Then, the pixels have their gray levels changed following a certain rule that takes into account the region where the pixel is inserted and the value of the bit to be embedded. Kutter proposed a scheme to embed a geometric transformation resistant watermark in the spatial domain by using 2-D amplitude modulation.

Another technique used to embed watermark is Spread Spectrum Technique in which the watermark is introduced in the frequency domain. The most commonly known method for Spread Spectrum Method by Cox et al, described in U.S. Pat. No. 6,208,735, uses spread spectrum communication techniques to embed a bit in the image. Koch et al reported efficient DCT domain watermarking resisting to JPEG compression.

In order to detect watermarks, generally non-blind watermark detection techniques are used. In these techniques, it is required to have the presence of original unmarked data along with the data suspected to be watermarked. In this method, first the original data is transformed to the spatial or any other known domain using Fast Fourier Transformation (FFT) and Discrete Cosine Transformation (DCT) techniques. Then the perceptually significant components are identified and extracted from the marked as well as unmarked data, and then compared to detect the presence of the watermark. Prior art also exists for computing the similarity between the watermark obtained from the suspected watermarked data and the original data.

The disadvantage with the above method is that one has to identify the significant components in both original as well as watermarked data and thereafter compare. This is a complex process, which results in a delay in arriving at the results. Also the accuracy to which the presence of watermark is verified is not very high, because the perceptually significant components might not always contain the watermark.

OBJECTS AND SUMMARY OF THE INVENTION

The object of the present invention is to obviate the above drawbacks and provide a simple method and system for detecting watermark with high accuracy and without any delay.

To achieve the said object this invention provides a method for detecting watermarks in a digital data for the purpose of electronic copyright management system comprising the steps of:
 transforming the original, unwatermarked data,
 tagging the resultant components of the transformed,
 selecting significant tagged components in transformed data,
 transforming the suspected watermarked data,
 tagging the components in the transformed suspected watermark data,
 selecting the tagged components from the transformed suspected watermarked data corresponding to those selected as significant in the original transformed data, and
 comparing said two groups of selected tagged components to detect the presence of watermarks.

The said digital data includes images, sound and video.

The said original and suspected watermarked data is transformed using techniques including FFT, block FFT, DCT, modified DCT, wavelet and Hadamard transform.

The transformed data components are tagged using known schemes including, serially numbering scheme or by identifying row and column components in a matrix form.

The significant components of the data are perceptually significant components.

The comparing between two sets of tagged components is by computer variance.

The above method optionally comprises the step of resizing the said suspected watermarked data to the same size as the said original data before being transformed.

The present invention further provides a device for detecting watermarks in digital data for the purpose of electronic copyright management system comprising:
 means for transforming the original, unwatermarked data,
 means for tagging the resultant components of the transformed data,
 means for selecting significant tagged components in the said transformed data,
 means for transforming the suspected watermarked data,
 means for tagging the components in the transformed suspected watermark data,
 means for selecting the tagged components from the transformed suspected watermarked data corresponding to those selected as significant in the original transformed data, and
 means for comparing said two groups of selected tagged components to detect the presence of watermarks.

The said digital data includes images, sound and video.

The data transformation means include FFT, block FFT, DCT, modified DCT, wavelet and Hadamard transform.

The means for selecting is a selector and means for comparing is a computer variance means.

The tagging means for said transformed data components are known schemes including serially numbering scheme or by arrangement of components in matrix form.

The significant components of the data are perceptually significant components.

The above device optionally comprising means to resize the said suspected watermarked data to the same size as the said original data before being transformed.

The present invention also provides a computer program product comprising computer readable program code stored on a computer readable storage medium embodied therein for detecting watermarks in digital data for the purpose of electronic copyright management system, comprising:

computer readable program code configured for transforming the original, unwatermarked data, computer readable program code configured for tagging the resultant components of the transformed data, computer readable program code configured for selecting significant tagged components in the said transformed data, computer readable program code configured for transforming the suspected watermarked data, computer readable program code configured for tagging the components in the transformed suspected watermark data, computer readable program code configured for selecting the tagged components from the transformed suspected watermarked data corresponding to those selected as significant in the original transformed data, and computer readable program code configured for comparing said two groups of selected tagged components to detect the watermarks.

The said digital data includes images, sound and video.

The data transformation means include FFT, block FFT, DCT, modified DCT, wavelet and Hadamard transform.

The said tagging means for said transformed data components are known schemes including serially numbering scheme or arrangement of components in matrix form.

The said significant components of the data are perceptually significant components.

The similarity detection means between two sets of tagged components uses computer variance code.

The said computer program optionally comprises code for resizing the said suspected watermarked data to the same size as the said original data before being transformed.

BRIEF DESCRIPTION OF THE DRAWINGS

The invention will now be described with reference to the accompanying drawings.

DETAILED DESCRIPTION OF THE DRAWINGS

Figure 1:
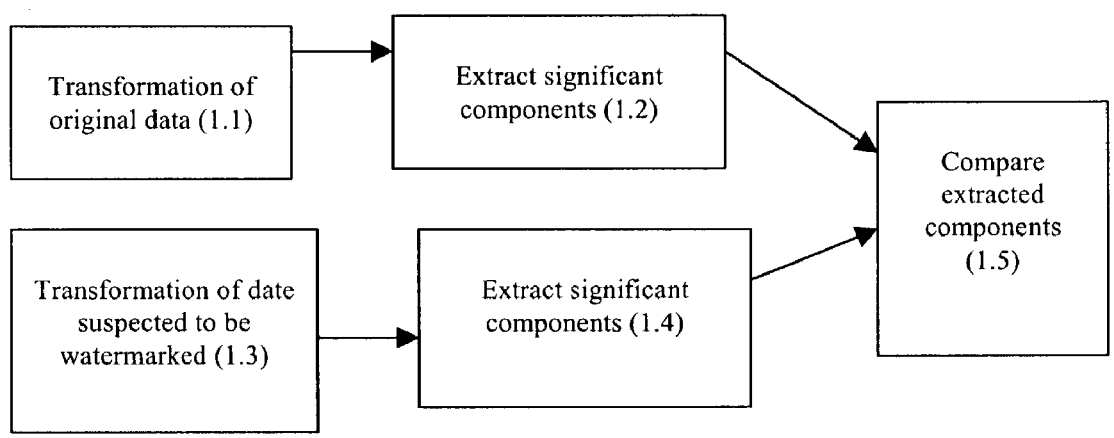
FIG. 1 shows a flowchart depicting the conventional method.

In FIG. 1 step 1.1 involves the transformation of original data. The significant components are identified and extracted (1.2). Similarly, step (1.3) involves the transformation of suspected watermark data. Then the significant components are identified and extracted (1.4). The said extracted significant components (1.2) and (1.4) are compared in the final step (1.5) to detect the presence of the watermark. This is a conventional method.

Figure 2:
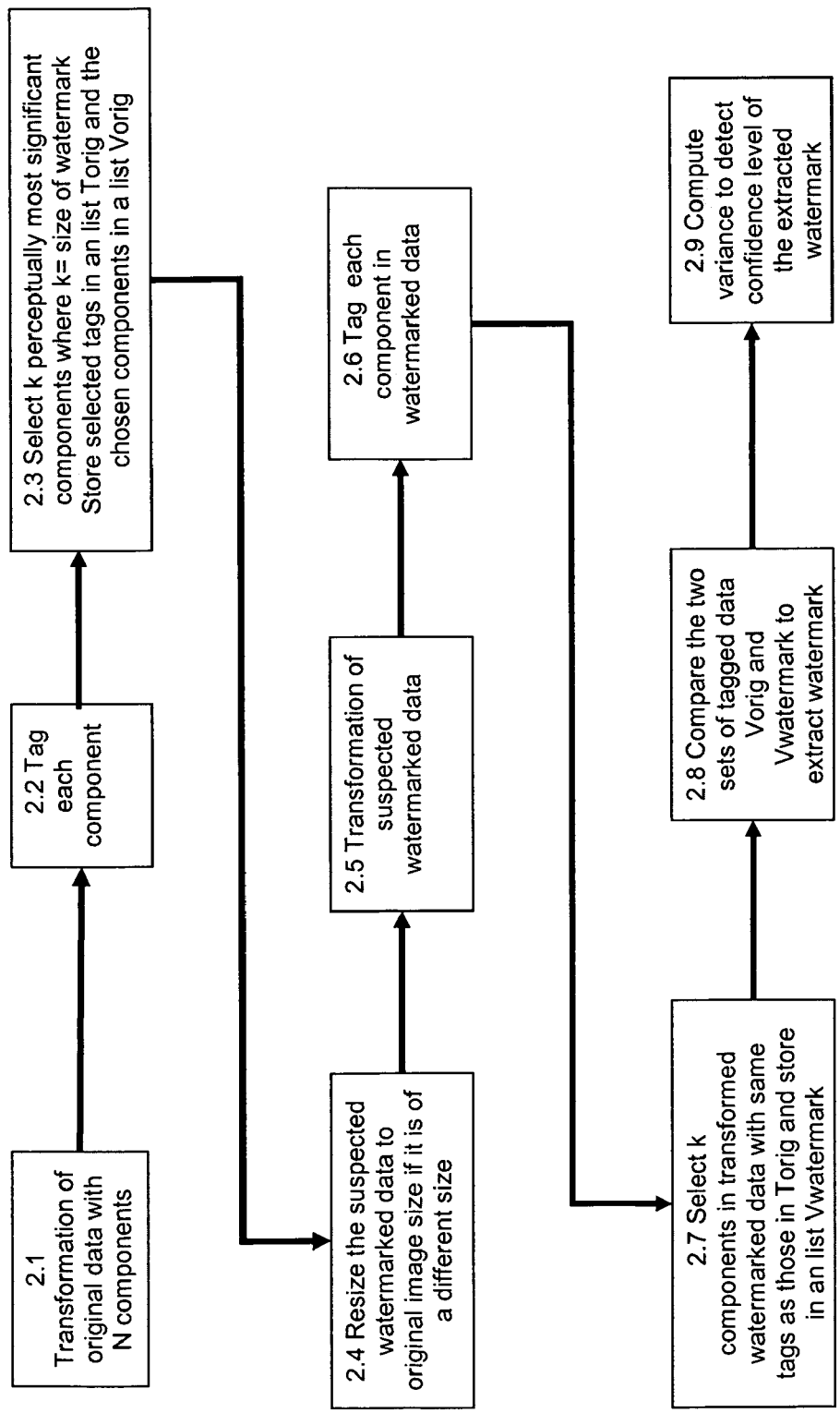
FIG. 2 shows a flowchart for the instant invention.

FIG. 2 illustrates the instant invention. Step (2.1) involves the transformation of the original data to obtain N components. Each component obtained from the transformation is then tagged (2.2). The k most perceptually significant components are selected (2.3), where k is the size of the watermark and the tag values of these chosen components is stored in a list Torig. The chosen components are stored in a list Vorig. If the suspected watermarked data is an image of a different size than the original data, it is resized to match the original data (2.4). The watermarked data is then transformed (2.5) using the same transformation performed on the original data. Each component in the watermarked data is then tagged (2.6). The components with the same tag values as the original data are chosen and stored in a list Vwatermark (2.7). The two sets of tagged data Vorig and Vwatermark are then compared (2.8). The variance is computed (2.9) to detect presence of watermark.

It should be noted here that in some cases, the suspected data might have to be processed prior to transformation. Such as in the case of an image of a different size from the original image, it has to be resized to the same size as the original image. This is necessary so that after transformation the result is the same number of components as in the case of original data.

Figure 3:
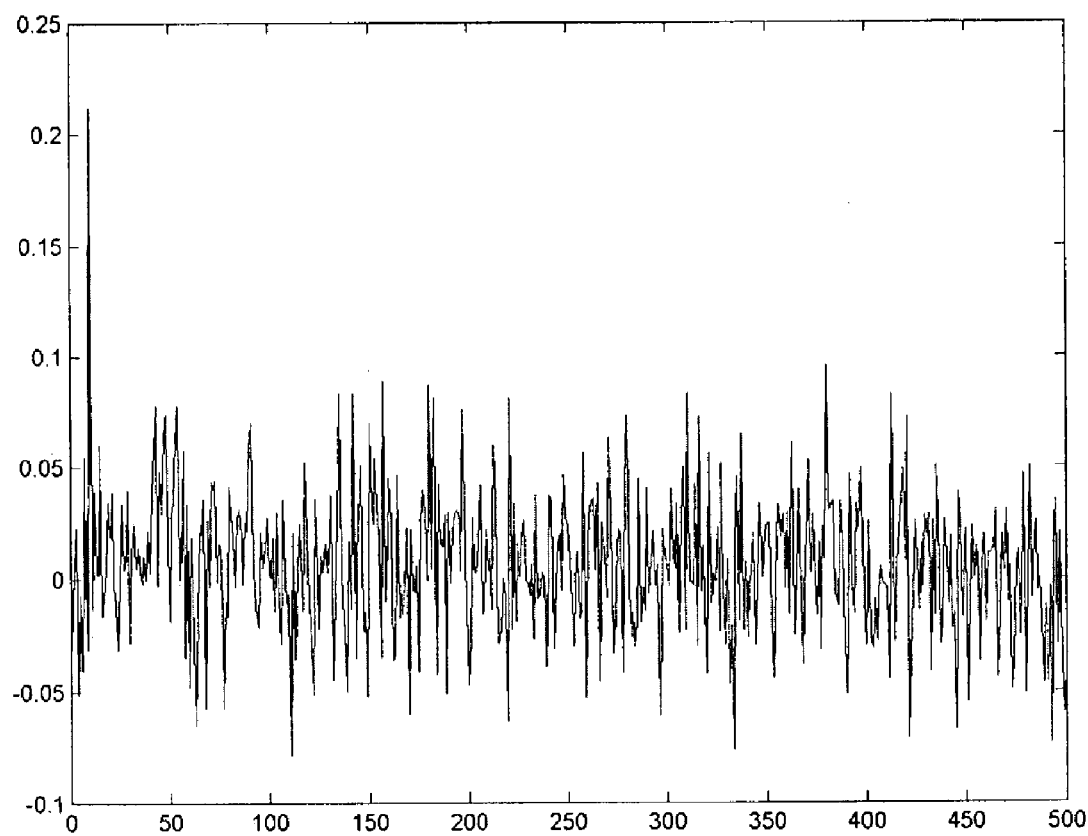
FIG. 3 depicts the response of the system to different conventional methods.
Figure 4:
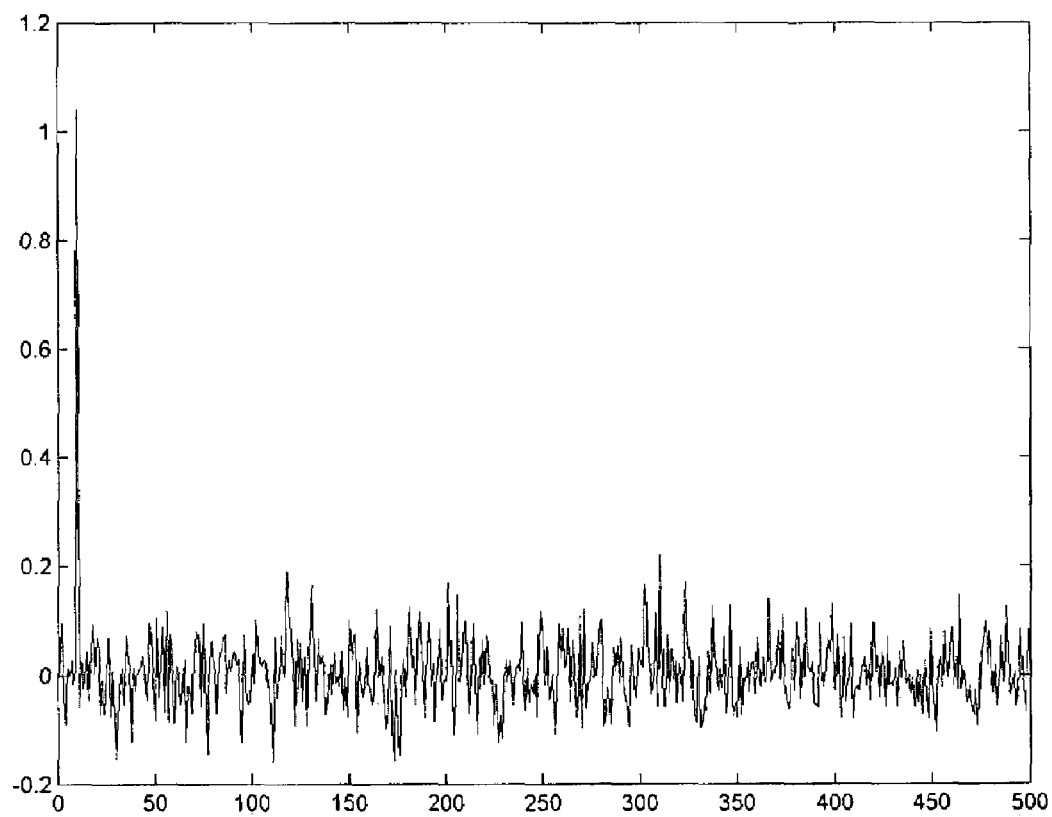
FIG. 4 shows the response of the system using the instant invention.

FIGS. 3 and 4 illustrate the benefits of the instant invention over the conventional method. An image was watermarked by embedding the watermark in the frequency domain making use of FFT and spread spectrum techniques. The watermarked image underwent severe degradation in the form of resizing, conversion to grayscale, printing and scanning it to a digital image. In FIG. 3. using the conventional method we see that the coefficient of correlation for the watermark is 0.2, while in FIG. 4 the correlation is 1. This enabled detection of watermarks with a much higher level of confidence.

We claim:

1. A method for detecting watermarks in a digital data for the purpose of electronic copyright management system comprising the steps of: transforming the original, unwatermarked data, tagging the resultant components of the transformed, selecting significant tagged components in the said transformed data, transforming the suspected watermarked data, tagging the components in the transformed suspected watermark data, selecting the tagged components from the transformed suspected watermarked data corresponding to those selected as significant in the original transformed data, and comparing said two groups of selected tagged components to detect the presence of watermarks.

2. A method for detecting watermarks in digital data as claimed in claim 1 wherein said digital data consists essentially of images, sound and/or video.

3. A method for detecting watermarks in digital data as claimed in claim 1, wherein said original and suspected watermarked data is transformed using a technique selected from the group consisting of FFT, block FFT, DCT, modified DCT, wavelet and Hadamard transform.

4. A method for detecting watermarks in digital data as claimed in claim 1 wherein said transformed data components are tagged using known schemes including, serially numbering scheme or by identifying row and column components in a matrix form.

5. A method for detecting watermarks in digital data as claimed in claim 1 wherein said significant components of the data are perceptually significant components.

6. A method for detecting watermarks in digital data as claimed in claim 1 wherein said comparing between two sets of tagged components is by computing variance.

7. A method for detecting watermarks in digital data as claimed in claim 1 optionally comprising the step of resizing the said suspected watermarked data to the same size as the said original data before being transformed.

8. A device for detecting watermarks in digital data for the purpose of electronic copyright management system comprising: means for transforming the original, unwatermarked data, means for tagging the resultant components of the transformed data, means for selecting significant tagged components in the said transformed data, means for transforming the suspected watermarked data, means for tagging the components in the transformed suspected watermark data, means for selecting the tagged components from the transformed suspected watermarked data corresponding to those selected as significant in the original transformed data, and means for comparing said two groups of selected tagged components to detect the presence of watermarks.

9. A device for detecting watermarks in digital data as claimed in claim 8 wherein said digital data consists essentially of images, sound and/or video.

10. A device for detecting watermarks in digital data as claimed in claim 8 wherein data transformation means is selected from the group consisting of FFT, block FFT, DCT, modified DCT, wavelet and Hadamard transform.

11. A device for detecting watermarks in digital data as claimed in claim 8 wherein the means for selecting is a selector.

12. A device for detecting watermarks in digital data as claimed in claim 8 wherein said tagging means for said transformed data components are known schemes including serially numbering scheme or by arrangement of components in matrix form.

13. A device for detecting watermarks in digital data as claimed in claim 8 wherein said significant components of the data are perceptually significant components.

14. A device for detecting watermarks in digital data as claimed in claim 8 wherein means for comparing between two sets of tagged components is computing variance means.

15. A device for detecting watermarks in digital data as claimed in claim 8 optionally comprising means to resize the said suspected watermarked data to the same size as the said original data before being transformed.

16. A computer program product comprising computer readable program code stored on a computer readable storage medium embodied therein for detecting watermarks in digital data for the purpose of electronic copyright management system, comprising: computer readable program code configured for transforming the original, unwatermarked data, computer readable program code configured for tagging the resultant components of the transformed data, computer readable program code configured for selecting significant tagged components in the said transformed data, computer readable program code configured for transforming the suspected watermarked data, computer readable program code configured for tagging the components in the transformed suspected watermark data, computer readable program code configured for selecting the tagged components from the transformed suspected watermarked data corresponding to those selected as significant in the original transformed data, and computer readable program code configured for comparing said two groups of selected tagged components to detect the watermarks.

17. A computer program product as claimed in claim 16 wherein said digital data consists essentially of images, sound and/or video.

18. A computer program product as claimed in claim 16 wherein data transformation means is selected from the group consisting of FFT, block FFT, DCT, modified DCT, wavelet and Hadamard transform.

19. A computer program product as claimed in claim 16 wherein said tagging means for said transformed data components are known schemes including serially numbering scheme or arrangement of components in matrix form.

20. A computer program product as claimed in claim 16 wherein said significant components of the data are perceptually significant components.

21. A computer program product as claimed in claim 16 wherein computer readable program code configured for comparing between two sets of tagged components is computing variance code.

22. A computer program product as claimed in claim 16 optionally comprising computer readable program code configured for resizing the said suspected watermarked data to the same size as the said original data before being transformed.

* * * * *